(12) United States Patent  (10) Patent No.: US 6,735,874 B2
Iacona  (45) Date of Patent: May 18, 2004

(54) CUTTING HEAD FOR A ROTARY TRIMMER (75) Inventor: Fernando R. Iacona, Scottsdale, AZ (US)

(73) Assignee: Kwik Products, Inc., Scottsdale, AR (US)

(*) Notice: Subject to any disclaimer, the term of this patent is extended or adjusted under 35 U.S.C. 154(b) by 0 days.

(21) Appl. No.: 10/447,034

(22) Filed: May 27, 2003

(65) Prior Publication Data
US 2003/0226261 A1 Dec. 11, 2003

Related U.S. Application Data
(60) Provisional application No. 60/388,155, filed on Jun. 11, 2002.

(51) Int. Cl.$^7$ ............................................... A01B 34/67
(52) U.S. Cl. ......................................................... 30/276
(58) Field of Search ..................... 30/276, 347; 56/12.7

(56) References Cited
U.S. PATENT DOCUMENTS 4,882,843 A * 11/1989 Baba ........................... 30/276
5,623,765 A * 4/1997 Ner-Gaon .................... 30/276
6,418,627 B1 * 7/2002 Tsunoda et al. .............. 30/347
6,446,345 B1 * 9/2002 Tsunoda et al. .............. 30/276

* cited by examiner

Primary Examiner—Douglas D. Watts
(74) Attorney, Agent, or Firm—Anthony J. Casella; Gerald E. Hespos (57) ABSTRACT

A cutting head for a rotary trimmer has a rotating body from which several flexible cord-like filament cutting blades or flails extend radially so that additional flail length can be fed from the device by merely bumping the rotating body on the ground. The improvement includes a plurality of truncated, bell-shaped configured tangs which extend into a serpentinous cam slot. Bumping of the device on the ground causes the tangs to move from stable positions to other stable positions allowing relative movement between the outer case of the trimmer and a spool of flail therein so that a predetermined length of flail is fed out through the case.

6 Claims, 5 Drawing Sheets

CUTTING HEAD FOR A ROTARY TRIMMER

This application claims the benefit of the filing date of U.S. Provisional Patent Application No. 60/388,155 filed Jun. 11, 2002, the disclosure of which is incorporated herein by reference.

BACKGROUND OF THE INVENTION

1. Field of the Invention

The subject invention relates to cutting heads for rotary trimmers and, more specifically, it relates to an improved cutting head for rotary trimmers using monofilament string as a means for cutting vegetation. The subject invention represents an improvement over presently existing cutter head designs and allows for a smoother, more efficient feedout of the monofilament string during operation of the cutter head.

2. Description of the Related Art

Flail feedout means for mowing and trimming devices used to trim grass, weeds, and other vegetation, of the rotary type equipped with flexible cord-like flails formed of generally cylindrical fibers, are well known in the art. Grass and weed cutters of this general type are widely known and the subject of various patented devices including those described in Ballas et al., U.S. Pat. No. 3,826,068; Mizuno et al., U.S. Pat. No. 4,020,552; Prouix, U.S. Pat. No. 4,097,991; Perdue, U.S. Pat. No. 4,134,204; Toro, Belgium Patent No. 852,150; and Prouix, U.S. Pat. No. 4,259,782. Such devices are available on the market having automatic flail feedout mechanisms which respond to a bump on the ground intentionally applied by the operator or by the application of force applied thereto by some mechanical arrangement. Such mechanisms usually consist of a dog or friction clutch located between a spool of flail and the case thereabout through which the flail is fed. By bumping an extension of the spool on the ground, the friction clutch is disengaged for a length of time dependent on the duration of the bump. The dog clutch released by the bump then abruptly engages at the next opportunity to feed out flail in segment lengths which are related to the engagement points of the dog clutch. Such dog clutches have outwardly extending ribs which engage inwardly extending abutment tangs and therefore depend upon a skillful bump when it is desired that they move only one segment. However, friction within the device and overzealous bumping can result in two or more line segments being fed out, especially when the device has been in use and the corners on the ribs and tangs have worn so that positive engagement is no longer assured.

An improved flail feedout mechanism for a rotary mower is disclosed in the above-mentioned U.S. Pat. No. 4,259,782, the disclosure of which is incorporated herein by reference. This prior art mower includes a handle with drive means which are connected to a spinning housing which contains a spool of one or more coils of filaments used as flails, an orifice through the housing for each coil for extending the flail outwardly into cutting position, and means which normally restrict movement between the spool and the housing but can be released a predetermined rotational distance so that additional flail can be fed out of the orifice. These last-mentioned means include, as part of the spool, a downwardly projecting bumper which is normally used to space the flail above the surface on which vegetation is being cut. The spool, bumper and the intermediate member, as an assembly, are spring loaded downwardly with respect to the spinning housing. Extending inwardly from the intermediate cylinder are tangs which ride in a serpentinous cam slot in a cam member fixed to the housing. When the bumper is bumped on the ground, the intermediate cylinder is moved upwardly so that its tangs ride up relatively vertical cam surfaces until they reach spiral surfaces which extend downwardly to the next vertical cam surfaces. The net effect is that the spool, connected to the intermediate members, and the housing, connected to the cam member, rotate relative to each other to allow a predetermined length of flail to feed out as a result of centrifugal force acting on the flail. Since a serpentinous cam is used, a single bump can produce only one segment of flail feedout, and does so without the crunching engagement of the prior art dog clutches.

Despite the improvement in the rotary mowing and trimming device of U.S. Pat. No. 4,259,782, the specific construction of the tangs and the serpentinous cam slot in that device is designed to result in stress concentrations in the engaging members and, as a result, an abrupt and discontinuous operation of the feedout assembly which results in potential wear of the assembly parts, as well as non-smooth operation of the mowing device.

Accordingly, it is an object of the subject invention to provide an improved automatic flail feedout device which is reliable, easy and economical to manufacture, and which operates smoothly so that its performance does not degrade with use.

It is a further object of the subject invention to provide a mower which feeds out a predetermined amount of flail when desired in a smooth and consistent manner, without resulting in stress concentrations on the individual parts forming the feedout assembly.

SUMMARY OF THE INVENTION

The cutting head for a rotary trimmer of the subject invention is an improvement of the feedout mechansim of U.S. Pat. No. 4,259,782 and employs the same basic structural architecture. Briefly, the subject trimmer includes a hollow handle with an attached drive means that is connected to a spinning housing. The housing has a spool containing one or more coils of string used as filaments for cutting vegetation. A pair of orifices is oppositely positioned on the spool for guiding the exposed filament to the proper cutting position.

The feedout assembly includes a follower member having a number of tangs that have a base that is wider than the rounded end to form a taper from the base to the tip thereof. The follower member is coupled to a cam having offset tangs for controlling the amount of filament fed out of the cutting head to a predetermined length. The offset prongs are also configured to have a base that is wider than the rounded tip thereof to form a taper from the base to the tip. Furthermore, the taper of each offset prong is complimentary to the taper of each tang. The configuration of the subject invention results in better force distribution and the reduction of stress concentrations when the tangs and prongs engage each other, thereby resulting in a smoother feedout of the filament and a structurally enhanced feedout assembly. A biasing spring maintains the follower member and the cam properly positioned within the feedout assembly so that the filaments are fed out upon tapping of the subject cutting head against the ground.

DETAILED DESCRIPTION OF THE PREFERRED EMBODIMENT

Figure 1:
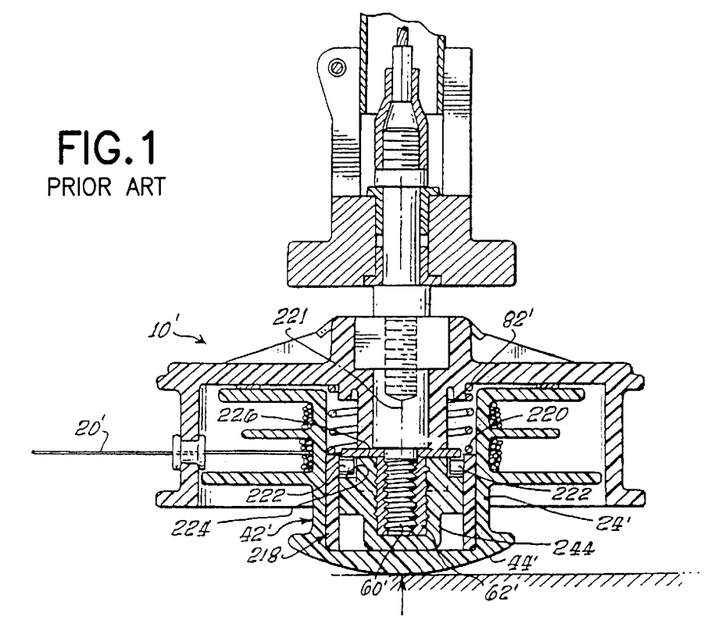
FIG. 1 is a cross-sectional view of a mower cutting head constructed according to the prior art and, more particularly, as disclosed in U.S. Pat. No. 4,259,782.
Figures 2, 3:
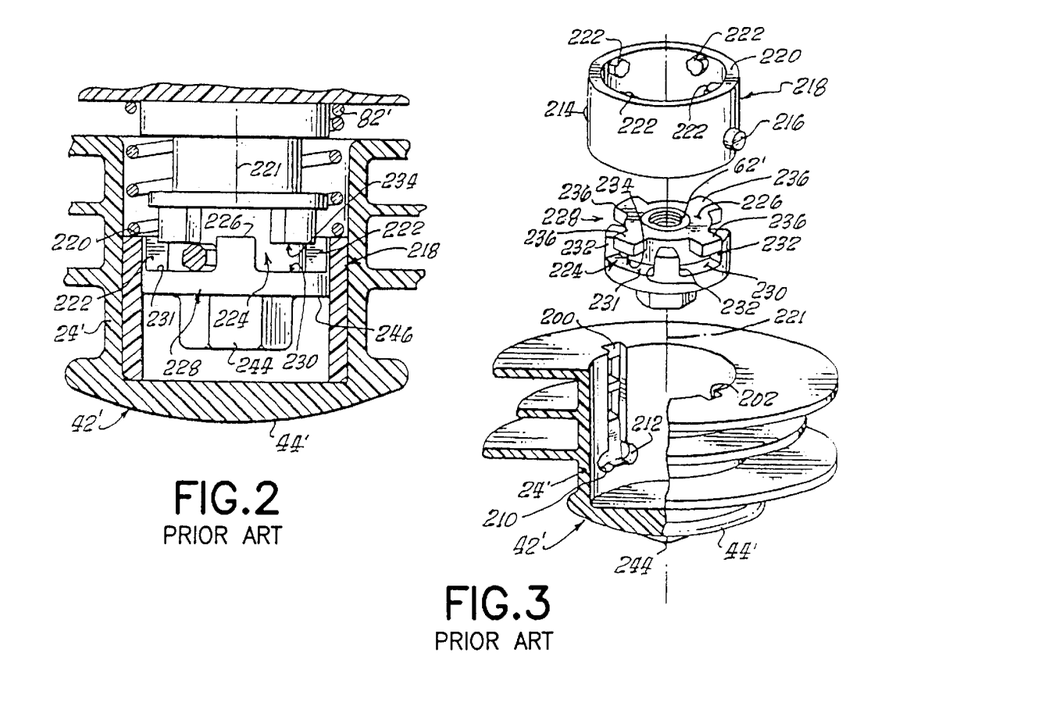
FIG. 2 is an enlarged partial cross-sectional view of the flail feedout of the prior art mower cutting head of FIG. 1.
FIG. 3 is an exploded view of the flail feedout of the prior art mower cutting head of FIG. 1.

FIGS. 1–3 illustrate the prior art cutting head 10' as disclosed in U.S. Pat. No. 4,259,782. In the operation of the prior art cutting head 10', when the bumper 44' is bounced or momentarily pressed on the ground, knobs 214 and 216 are forced out of the cutouts 210 or 212, wherein they are retained against the force of spring 82' to hold the spool in the assembly, and knobs 214 and 216 ride upwardly in the grooves 200 and 202 against the force of the biasing spring 82'. The latter presses downwardly on the upper surface 220 of a follower member 218. Rotation of the spool assembly 42' is slowed or stopped during the bounce or pressing of the bumper 44' against the ground to allow line to feed out. When the bumper 44' is no longer pressed against the ground, the knobs 214, 216 are spring-urged back into cutouts 210, 212 to again retain the spool. As shown in FIG. 1, the knobs 214 and 216 are generally of cylindrical shape and are oriented to extend radially outwardly with respect to the axis 221 of the follower member 218.

Follower member 218 also includes four uniformly spaced upwardly facing tangs 222 adjacent the upper surface 220 of the follower member 218. The position and spacing of the tangs 222 determine, in part, the amount of filament segment 20' released per filament release cycle when the bumper 44' is bounced or momentarily pressed on the ground. The tangs 222 ride in a serpentinous cam groove 224 formed adjacent the upper surface 226 of a cam member 228. The groove 224 has radially oriented lower surfaces 230, 231 and vertical abutment portions 232 at 90° to the bottom surfaces 231. As illustrated in FIGS. 1–3, the vertical abutment portions 232 form a sharp right angle connection with both the bottom surfaces 231 and the upper surfaces of the tangs 236. The upper surface 234 of the cam groove 224 is formed by a plurality of radially outwardly oriented generally rectangular tangs 236 so that the serpentinous path of the cam groove 224 jogs at right angles. As shown in FIGS. 2 and 3, the tangs 222 are restricted to motion within the cam groove 234 and, depending upon the rotational direction of the spool 24', the tangs 222 move from one adjacent vertical surface 232 to the next facing vertical surface in the same direction. The tangs 222 include sidewardly facing planar abutment surfaces which assist in reducing the hammering pressures when the tangs 222 move from abutment with one surface 232 to the next surface.

The cam member 228 is rotated by threaded attachment by way of an insert 62' molded into the member 228. The latter can be removed from the screw 60' by application of torque to a nut shaped portion 244 molded in the bottom surface 246 of the member 218.

Figure 4:
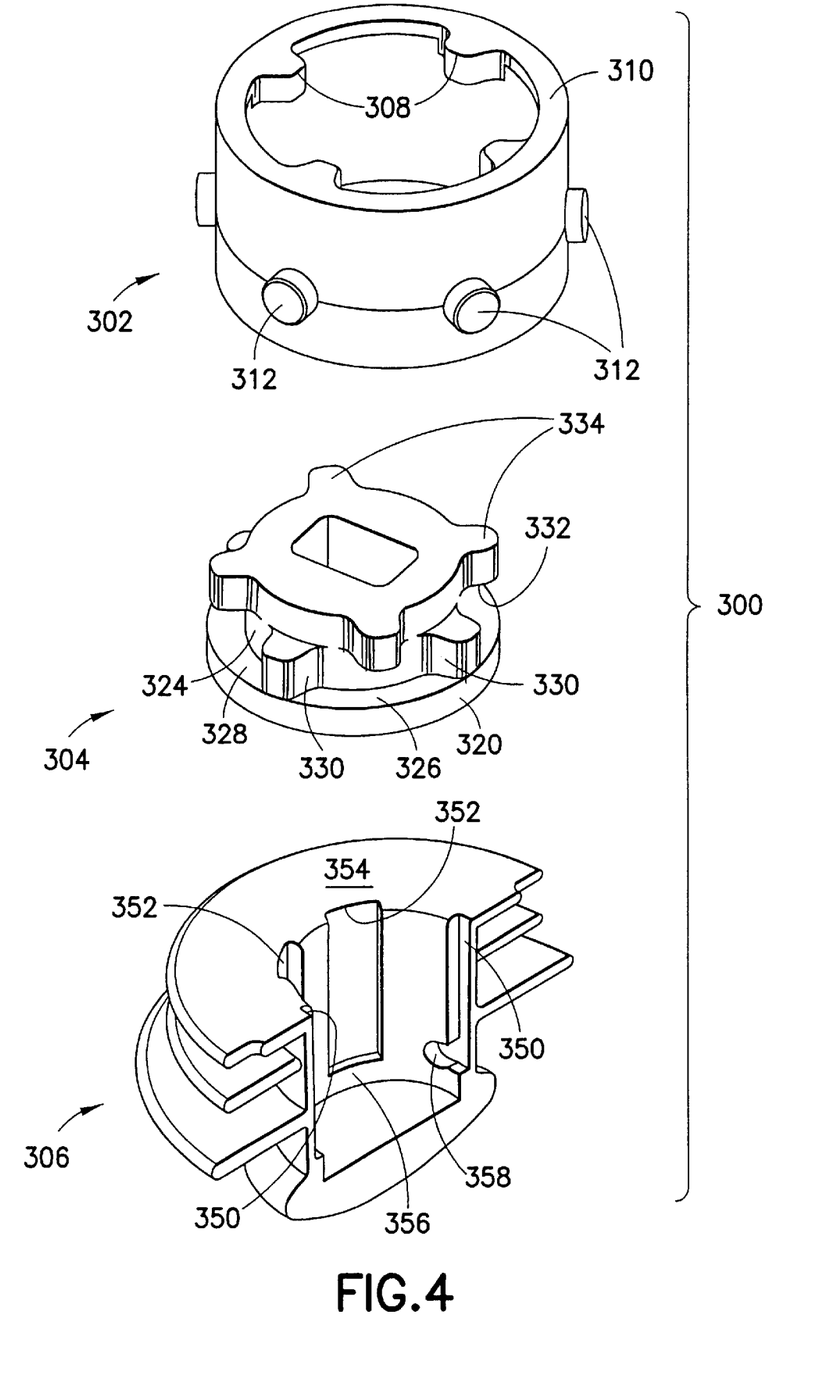
FIG. 4 is an exploded perspective view of the flail feedout assembly of the subject invention.

FIGS. 4–7 illustrate the flail feedout mechanism or assembly according to the subject invention. As indicated above, the flail feedout mechanism assembly of the subject invention is employed in a cutting head for a rotary trimmer and employs the same basic structural architecture as described in U.S. Pat. No. 4,259,728, except for the structural improvements embodied in the flail feedout mechanism assembly 300, as illustrated in FIG. 4. The flail feedout assembly 300 of the subject invention basically comprises a follower member 302, a cam member 304, and a spool member 306. As illustrated in FIG. 4 as well as FIGS. 6A, 6B and 6C, the follower member 302 is of generally cylindrical configuration having four uniformly spaced, upwardly facing tangs 308 adjacent the upper surface 310 of the follower member 302. Projecting radially outwardly of the follower member 302, and uniformly spaced, are six knobs, each designated by the numeral 312. As shown in FIG. 4 and FIGS. 6B and 6C, the knobs 312 are disposed intermediate the sidewall of the follower member 302, with each knob 312 being of cylindrical configuration. As shown in FIG. 6A, the knobs 312 are uniformly spaced in a radial direction at an angle of 60° relative to each other. As also shown in FIG. 6A, two diametrically opposed knobs 312 are disposed in the same plane as two diametrically opposed tangs 308.

Referring to FIGS. 5A–5D, the cam member 304 has a lower, annular plate 320 of a diameter slightly less than the inner diameter of the cylindrical follower member 302. Angular plate 320 includes a central hole 322. Formed integral with the plate 320, and formed adjacent the upper surface of the cam member 304, is a serpentinous cam groove 324 whose function is similar to that of the cam member 224 described above. The groove 324 has radially oriented lower surfaces 326, 328 and vertical abutment portions 330 disposed at about 900 to the bottom surfaces 328. The upper surface 332 of the cam groove 324 is formed by a plurality of radially outwardly oriented tangs 334 so that the serpentinous path of the cam groove 324 jogs at right angles.

As shown in FIGS. 4 and 5A–5D, the tangs 334 are restricted to motion within the cam groove 324. The tangs 334 move from one adjacent vertical surface 330 to the next facing in the same direction. The tangs 334 include sidewardly facing planar abutment surfaces which assist in reducing the hammering pressures when the tangs 334 move from an abutment with one vertical surface 330 to the next.

Figure 5A:
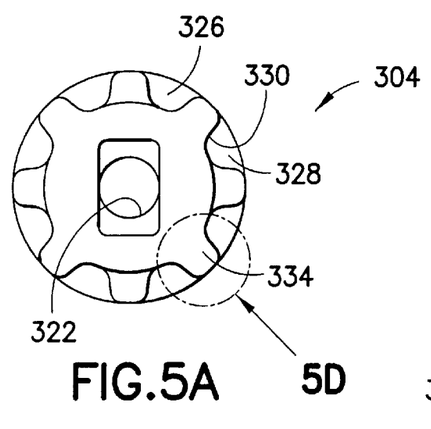
FIG. 5A is a top plan view of the cam member of the flail feedout assembly of the subject invention.
Figure 5B:
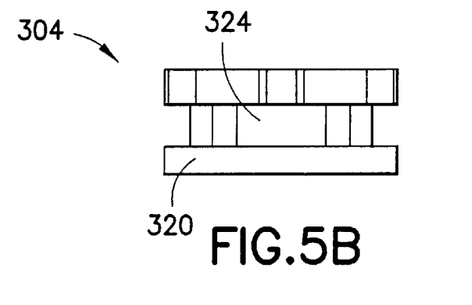
FIG. 5B is a side elevational view of the cam member of the flail feedout assembly of the subject invention.
Figure 5C:
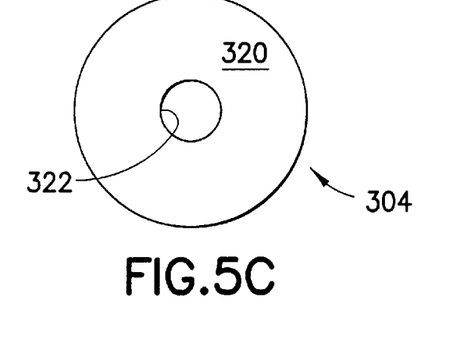
FIG. 5C is a bottom plan view of the cam member of the flail feedout assembly of the subject invention.
Figure 5D:
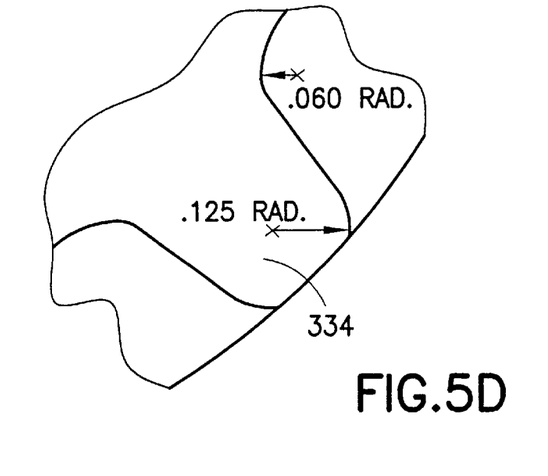
FIG. 5D is an exploded plan view of a tang of the cam member.
Figure 6A:
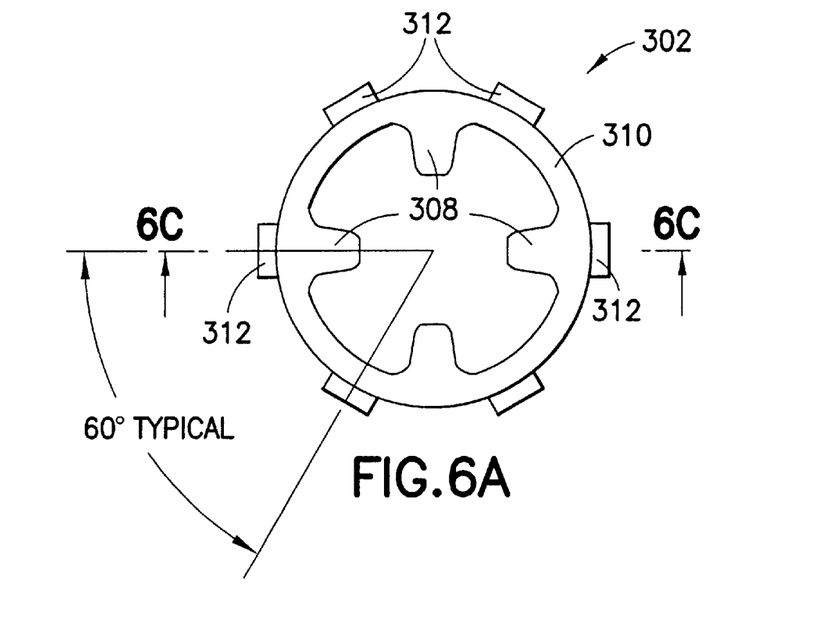
FIG. 6A is a top plan view of the follower member of the flail feedout assembly of the subject invention.
Figure 6B:
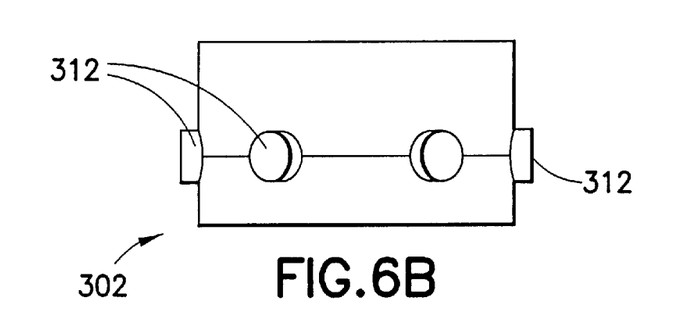
FIG. 6B is a side elevational view of the follower member of the flail feedout assembly of the subject invention.
Figure 6C:
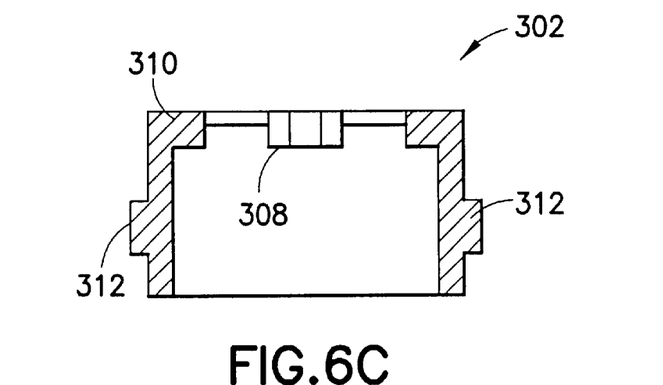
FIG. 6C is a cross-sectional view of the follower member taken along lines 6c—6c of FIG. 6A.
Figure 7A:
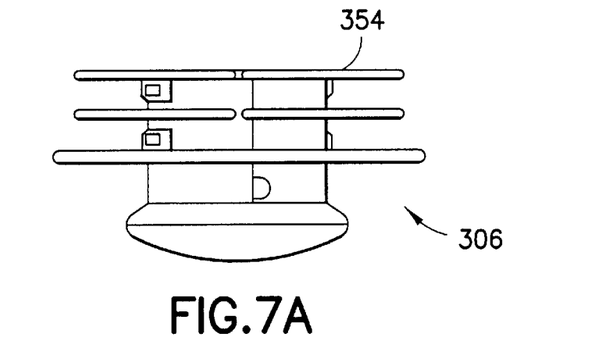
FIG. 7A is a side elevational view of the spool member of the flail feedout assembly of the subject invention.
Figure 7B:
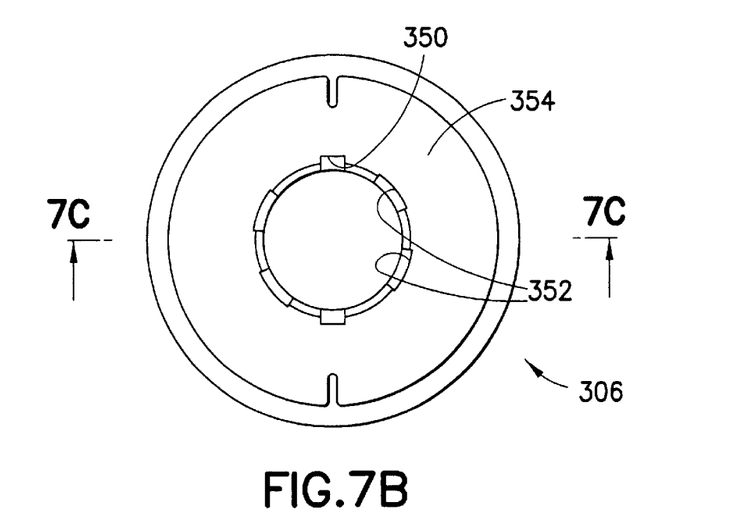
FIG. 7B is a top plan view of the spool member of the flail feedout assembly of the subject invention.
Figure 7C:
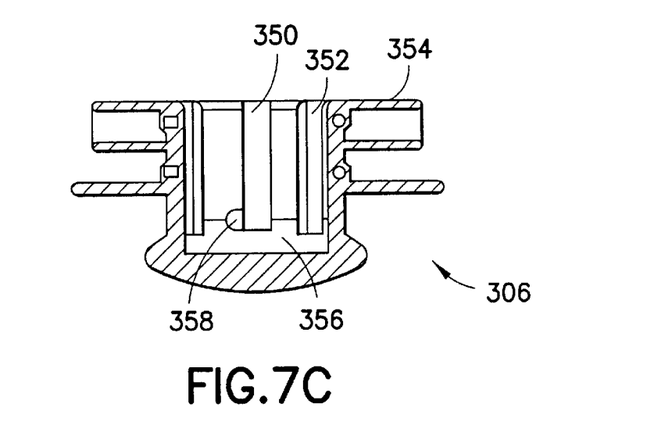
FIG. 7C is a cross-sectional view of the spool member taken along lines 7c—7c in FIG. 7B.

The tangs 308 of the follower member 302 and the tangs 334 of the cam member are different in configuration from the tangs 222 and 236 of the prior art device. More specifically, instead of being generally rectangular in plan form, as illustrated in FIG. 5D, each tang is of a truncated, bell-shaped configuration and thus is defined by multiple different radiuses. As a result, each tang 308, 334 is configured to avoid stress concentrations upon impact of the cam member and the follower member during a flail feedout operation. As particularly shown in FIG. 5D, the radius of each tang at its base is 0.060 inches whereas, at its radially outward position, the radius is 0.125 inches. This relationship of approximately 2:1 affords additional structural strength to the tangs, as well as avoiding stress concentrations, and results in a smoother, more efficient flail feedout mechanism.

Referring to FIGS. 4 and 7A–7C, the spool member 306 includes six grooves 350, 352 in its inner cylindrical surface 354. The grooves 350 are diametrically opposed and axially aligned within the spool member 306 and extend from the top surface 354 of the spool member 306 down to a radially oriented abutment surface 356 having lateral cutouts 358 adjacent thereto. The grooves 350 receive two outwardly extending, diametrically opposed knobs 312 which slide therealong and lock the follower member 302 to which the knobs 312 are mounted to rotate with the spool member 306. The grooves 352 also extend from the top surface 354 of the spool member 306 down to the radially oriented abutment surface 356, with the width of each groove 354 corresponding to the maximum width of the grooves 350, including the lateral cutouts 358. Accordingly, in the locked position of the follower member 302 in the spool member 306, each of the six knobs 312 bears against a sidewall of the respective grooves 350, 352, thereby providing enhanced structural contact between the follower member 302 and the spool member 306 so as to improve the efficiency and smoothness of operation of the flail feedout assembly 300.

Thus, there has been shown and described an improved automatic flail feedout mechanism which fulfils all of the objects and advantages sought therefor. Many changes, modifications, variations, and other uses and applications of the subject invention will, however, become apparent to those skilled in the art after considering the foregoing specifications together with the accompanying drawings and claims. All such changes, modifications, variations, and other uses and applications which do not depart from the spirit and scope of the invention are deemed to be covered by the invention which is limited only by the claims which follow.

What is claimed is:

1. A cutting head for a rotary trimmer having two diametrically opposed cutting flails which extend outwardly from a spinning assembly including two major assemblies, a cap assembly and a spool assembly having an axis of rotation, a bumper for engagement with the ground and means to allow predetermined lengths of flail to feed outwardly in response to the striking of the bumper on the ground, the improvement comprising:

a cam member having a cam slot therein connected to one of said assemblies, said cam slot being a serpentinous cam slot having one portion formed by the radial surface of a washer, said cam slot being defined by radially extending tangs which are radially spaced, with alternate tangs being spaced along said axis of rotation so as to define said serpentinous cam slot, each said tang being of truncated, bell-shaped configuration so as to avoid stress concentrations;

a follower member connected to the other of said assemblies and having diametrically opposed cam followers thereon positioned to ride in said cam slot, said follower member further including six outwardly extending knobs, said spool assembly surrounding said follower member and having six grooves extending parallel to said axis of said spool assembly, said grooves having parallel sidewalls, with two diametrically opposed grooves having lateral cutouts at the lower ends thereof for receiving two of said knobs, said two of said knobs being positioned in said lateral cutouts to releasably retain said follower member to said bumper;

said cam follower of the follower member being defined by four radially spaced tangs extending radially inwardly of said follower member, each said tang being of truncated, bell-shaped configuration for minimizing stress concentrations when said cam follower is engaged in said cam slot; and biasing means acting between said cam member and said follower member tending to urge said cam follower into stable positions on said cam slot when undisturbed by force applied to said bumper and adapted to be overcome by suitable force applied to said bumper, said cam slot being generally parallel to the force applied by said biasing means.

2. A cutting head for a rotary trimmer as in claim 1 wherein said serpentinous cam slot has upper portions formed by the radial surface of said washer.

3. A cutting head for a rotary trimmer as in claim 1 wherein each tang of the cam member has a radius at its base which is approximately one-half the radius of the tang at its radially outward position for avoiding stress concentrations and resulting in a smoother, more effective flail feedout.

4. A cutting head for a rotary trimmer as in claim 1 wherein the maximum width of each of said six grooves is identical.

5. A cutting head for a rotary trimmer as in claim 1 wherein each of said four radially spaced tangs of the cam follower includes a radius at its radially outward position which, relative to the radius at the base thereof, is in the approximate relationship of 2:1 for minimizing stress concentrations and providing a smoother, more efficient flail feedout.

6. A cutting head for a rotary trimmer as in claim 1 wherein said follower member includes four equally spaced tangs having planar side surfaces and curved upper and lower surfaces.

* * * * *

US006735874C1

(12) INTER PARTES REEXAMINATION CERTIFICATE (0244th)
United States Patent
Iacona (10) Number: US 6,735,874 C1
(45) Certificate Issued: Mar. 8, 2011

(54) CUTTING HEAD FOR A ROTARY TRIMMER (75) Inventor: Fernando R. Iacona, Scottsdale, AZ (US)

(73) Assignee: Kwik Products, Inc., Scottsdale, AZ (US)

Reexamination Request:
No. 95/000,139, Mar. 29, 2006

Reexamination Certificate for:
Patent No.: 6,735,874
Issued: May 18, 2004
Appl. No.: 10/447,034
Filed: May 27, 2003

Related U.S. Application Data

(60) Provisional application No. 60/388,155, filed on Jun. 11, 2002.

(51) Int. Cl.
*A01G 3/06* (2006.01)

(52) U.S. Cl. .......................................... 30/276
(58) Field of Classification Search ............... 30/276
See application file for complete search history.

(56) References Cited

U.S. PATENT DOCUMENTS

| 4,097,991 A | 7/1978 | Proulx |
| 4,259,782 A | 4/1981 | Proulx |
| 4,458,419 A | 7/1984 | Proulx |
| 4,959,904 A | 10/1990 | Proulx |
| 2001/0016163 A1 | 8/2001 | Tomita et al. |
| 2002/0073813 A1 | 6/2002 | Takemura et al. |

OTHER PUBLICATIONS

S. Timoshenko and Gleason H. MacCullough, Elements of Strength of Materials, Fourth Printing, 1935, pp. 24–25, D. Van Nostrand Company, Inc., New York.

S. Timoshenko, Strength of Materials, Part II, Third Edition, 1956, pp. 498–499, D. Van Nostrand Company, Inc., Princeton, New Jersey.

*Primary Examiner*—Jimmy G Foster (57) ABSTRACT

A cutting head for a rotary trimmer has a rotating body from which several flexible cord-like filament cutting blades or flails extend radially so that additional flail length can be fed from the device by merely bumping the rotating body on the ground. The improvement includes a plurality of truncated, bell-shaped configured tangs which extend into a serpentinous cam slot. Bumping of the device on the ground causes the tangs to move from stable positions to other stable positions allowing relative movement between the outer case of the trimmer and a spool of flail therein so that a predetermined length of flail is fed out through the case.

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *